Nov. 5, 1957 C. R. VEGREN 2,811,730
METHOD FOR RESIZING INTERNALLY THREADED ROCKET MOTOR TUBING
Filed March 13, 1953
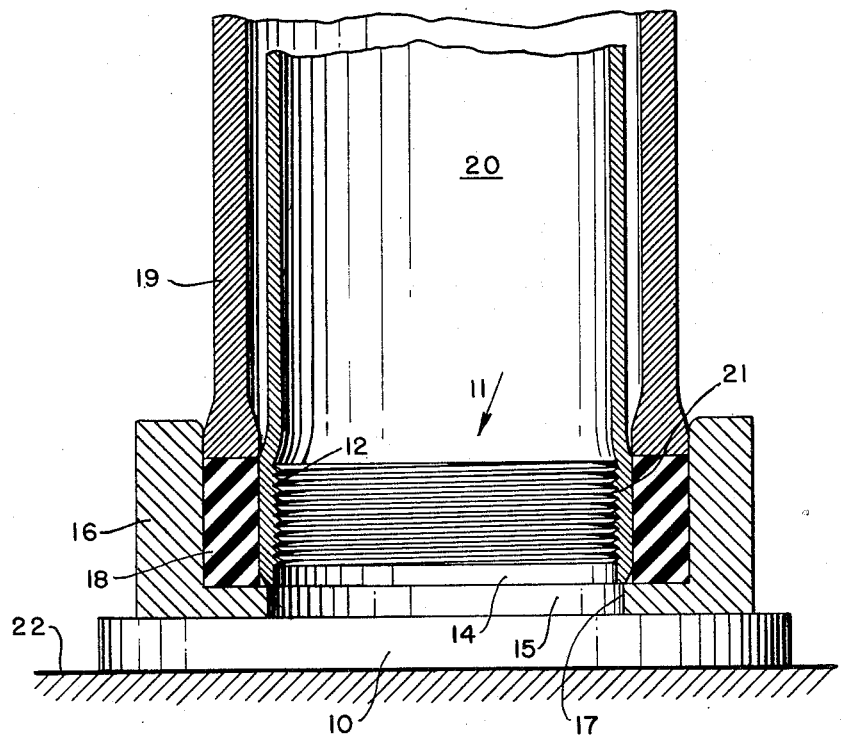
INVENTOR.
CONRAD R. VEGREN

United States Patent Office 2,811,730
Patented Nov. 5, 1957

2,811,730

METHOD FOR RESIZING INTERNALLY THREADED ROCKET MOTOR TUBING

Conrad R. Vegren, Washington, D. C.

Application March 13, 1953, Serial No. 342,304

1 Claim. (Cl. 10—152)

(Granted under Title 35, U. S. Code (1952), sec. 266)

The invention described herein may be manufactured and used by or for the Government of the United States of America for governmental purposes without the payment of any royalties thereon or therefor.

This invention relates to the art of metal working and more particularly to methods and apparatus for reducing oversize internal threads in tubing to predetermined sizes.

In the art of rockets it is common practice to secure the rocket motor tubes to an adjacent component, such as a war head or nozzle, by means of female threads disposed adjacent an end of the tube which engage male threads on the adjacent component. These female threads are sometimes oversize beyond allowed tolerances, by reason of faulty machine work or other cause and it has been the practice in the past to reject such motor tubes. Since they are relatively expensive and the rejects are considerable, it becomes apparent that a large saving in cost could be effected if they could be economically salvaged.

Principal objects of this invention are to provide novel methods and apparatus for reducing oversize female threads in rocket motor tubes to predetermined acceptable sizes.

Other objects and many of the attendant advantages of this invention will be readily appreciated as the same becomes better understood by reference to the following detailed description when considered in connection with the accompanying drawings wherein:

The single figure in a side elevation of apparatus for practicing the method, portions being shown in section taken on a plane passing through the vertical axis of a rocket motor tube being resized thereby.

Referring in detail to the drawing, the subject of the invention comprises a base plate 10 having an upstanding projection 11 thereon, the latter having external threads 12, a cylindrical portion 14 approximately the same diameter as the major diameter of the threads, and a cylindrical pilot portion 15 somewhat larger than portion 14, the various parts of projection 10 all being concentric. A ring 16 surrounds projection 11 and is maintained in concentric relation therewith by a bore 17 which fits pilot 15. An annular resilient ring 18 of rubber or the like fits within ring 16 and is adapted to be compressed by the lower face of a tubular ram 19.

In operation, rocket motor tube 20, having oversize female threads 21 is screwed onto projection 11 to the position shown and ring 18 applied to the annular space between the outer surface of the motor tube and the inner surface of ring 16. The assembly is supported by any suitable surface such as platen 22 of a press and ram 19 forced toward the platen. The pressure applied to ring 18 produces radially inward forces against the outside wall of tube 20, which reduces its diameter and conforms it to the shape of the portions of member 11 which are disposed within the motor tube. These portions are constructed slightly undersize of the desired finished size to allow for the spring back of the tube when the pressure thereagainst is released. These portions are preferably of material which is harder than the tube so that they may correct the thread profile of the tube as well as the thread pitch diameter.

Obviously many modifications and variations of the present invention are possible in the light of the above teachings. It is therefore to be understood that within the scope of the appended claim the invention may be practiced otherwise than as specifically described.

What I claim is:

A method of reducing the diameter of an end portion of a metallic tube having internal threads in said portion, comprising the steps of applying the end portion to a position surrounding an externally threaded member having a pitch diameter less than the pitch diameter of the internal threads, applying a resilient member to a confining zone surrounding said portion, and compressing the resilient member in a direction parallel with the axis of the tube to effect application by it of radially inwardly directed forces to said portion of sufficient magnitude to permanently deform it to smaller diameter, and continuing the deformation of said portion until limited by the threaded member.

References Cited in the file of this patent

UNITED STATES PATENTS

| | | |
|---|---|---|
| 638,962 | Frank | Dec. 12, 1899 |
| 2,306,957 | Kniveton | Dec. 29, 1942 |
| 2,360,528 | Talmage | Oct. 17, 1944 |
| 2,375,574 | Metheny | May 8, 1945 |
| 2,621,701 | Galbraith | Dec. 16, 1952 |